United States Patent [19]
Hattori et al.

[11] Patent Number: 4,660,941
[45] Date of Patent: Apr. 28, 1987

[54] LIGHT DEFLECTION APPARATUS

[76] Inventors: Shuzo Hattori, No. 42-1, Aza Musashizuka, Oaza Nagakute, Nagakute-cho, Aichi-gun, Aichi-ken; Naomasa Wakita; Makoto Okuda, both of No. 14-18, Takatsuji-cho, Mizuho-ku, Nagoya-shi, Aichi-ken, all of Japan

[21] Appl. No.: 704,741
[22] Filed: Feb. 25, 1985

[30] Foreign Application Priority Data

Feb. 24, 1984 [JP] Japan ................................ 59-34786

[51] Int. Cl.⁴ ............................................. G02B 7/18
[52] U.S. Cl. ..................................................... 350/487
[58] Field of Search ......................................... 350/487

[56] References Cited

U.S. PATENT DOCUMENTS 4,203,654 5/1980 Ellis ..................................... 350/487
4,576,449 3/1986 Rüger .................................. 350/487

Primary Examiner—John K. Corbin
Assistant Examiner—Rebecca D. Gass
Attorney, Agent, or Firm—Darby & Darby

[57] ABSTRACT

A light deflection apparatus is disclosed, which comprises a tiltable member supported by point support and having a reflecting mirror surface provided at the top, and piezoelectric stacks respectively provided on perpendicular x- and y-axes intersecting at the support point and at positions spaced apart therefrom and capable of being elongated and contracted in vertical directions with application of voltage, the displaceable end of each of the piezoelectric stacks being coupled to the tiltable member to permit tilting of the reflecting mirror surface in a desired direction and to a desired extent about the support point with an elongation or contraction of the piezoelectric stacks.

6 Claims, 6 Drawing Figures

LIGHT DEFLECTION APPARATUS

BACKGROUND OF THE INVENTION

1. Field of the Invention

This invention relates to a light deflection apparatus for deflecting light in a desired direction by tilting a reflecting mirror in the direction of x- or y-axes of a plane according to the application of an electric signal.

2. Description of the Prior Art

As a light deflection apparatus in which a reflecting mirror is tilted, there is one using a bimorph cell as disclosed in Japanese Patent Publication Sho No. 52-40215. FIG. 6 shows the disclosed light deflection apparatus. The apparatus has a bimorph cell a which is curved with application of a voltage thereto. The bimorph cell a is secured at one end and coupled at the other end to a lower edge of reflecting mirror b, the reflecting mirror b being thereby supported and tilted with the curving of the cell noted above. In this structure, the support of the reflecting mirror b and cell a is effected with the sole securement of the end of the cell. Therefore, the mechanical strength of the structure is low, and the cell a is liable to be broken with application of force to the center of the structure. To cope with this, it is necessary to reduce load on the structure by reducing the thickness of the reflecting mirror b. Consequently, the reflecting mirror b is readily liable to be broken and difficult to handle. Further, the conditions for the tilting of the reflecting mirror b are determined by various factors such as the voltage applied to the cell a, distance from the secured portion of the cell a to the supported portion of the reflecting mirror b and the weight of the reflecting mirror b. With such a composite condition, it is difficult to attain a desired positional precision. Furthermore, a great inclination cannot be attained due to a load on the central part of the structure such as the reflecting mirror b.

SUMMARY OF THE INVENTION

This invention has an object of providing a light deflection apparatus which is free from the drawbacks noted above. According to the present invention, the above object is attained by a structure, which comprises a tiltable member supported by point support and having a reflecting mirror surface provided at the top, and piezoelectric stacks respectively provided on perpendicular x- and y-axes intersecting at the support point and at positions spaced apart therefrom and capable of being elongated and contracted in vertical directions with application of voltage, and the displaceable end of each of the piezoelectric stacks being coupled to the tiltable member to permit tilting of the reflecting mirror surface in a desired direction and to a desired extent about the support point with an elongation or contraction of the piezoelectric stacks.

The above-mentioned and other objects and features of the invention will become apparent from the following detailed description taken in conjunction with the drawings which indicate an embodiment of the invention.

BRIEF DESCRIPTION OF THE DRAWINGS

The accompanying drawings illustrate an embodiment of the present invention, and in which.

DESCRIPTION OF THE PREFERRED EMBODIMENT

Figure 1:
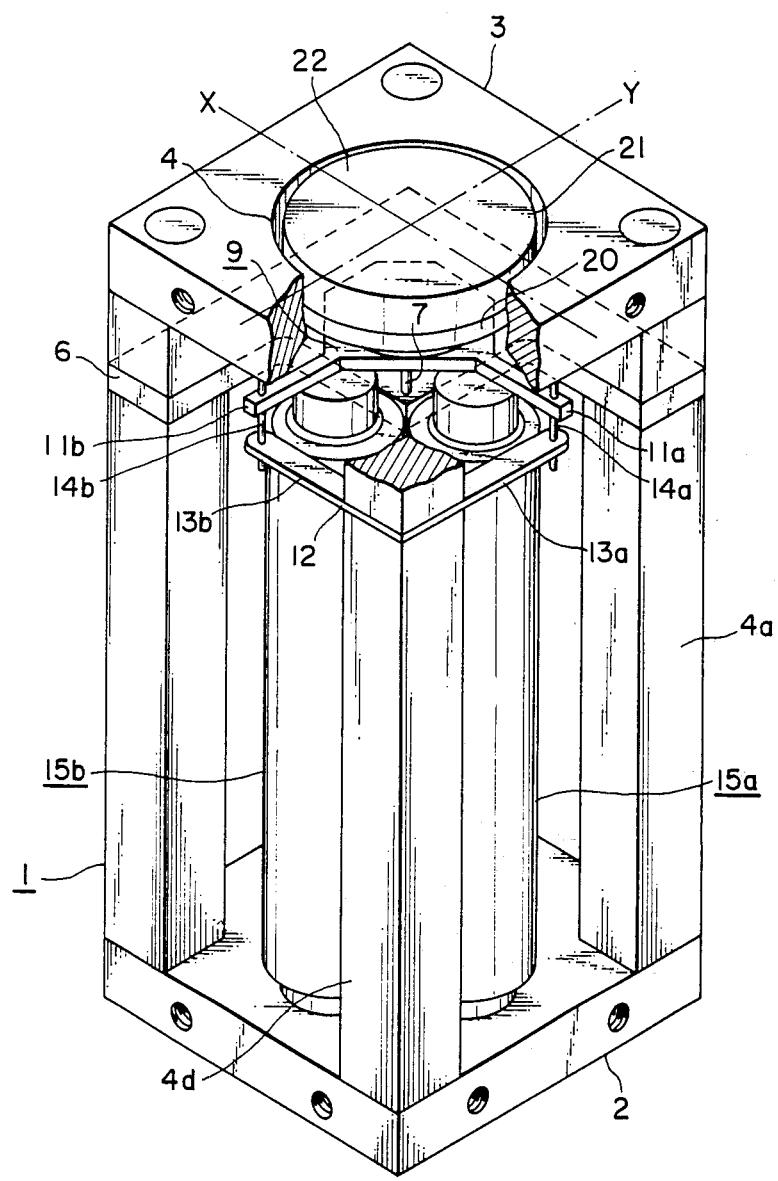
FIG. 1 is a perspective view of the embodiment.
Figure 2:
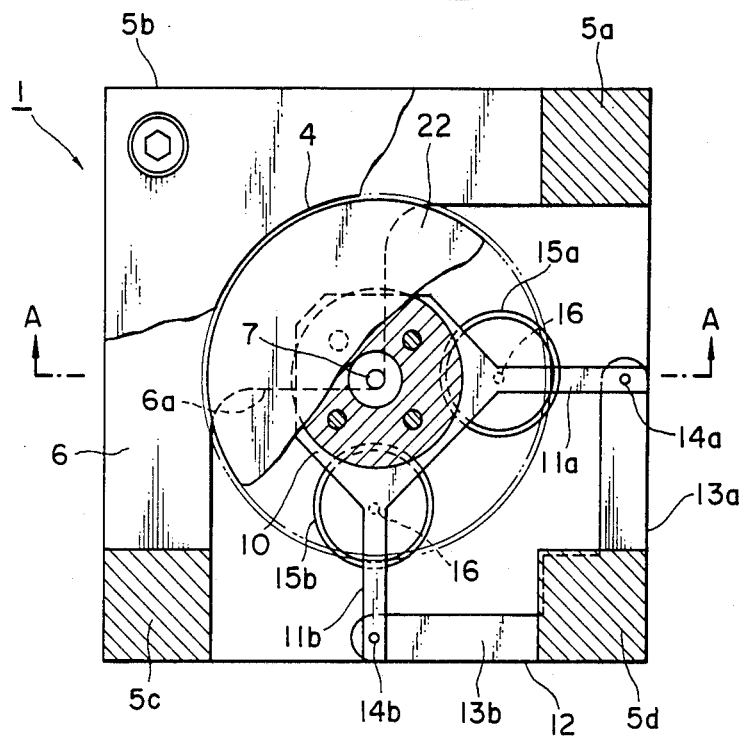
FIG. 2 is a plan view, partly broken away, showing the embodiment.
Figure 3:
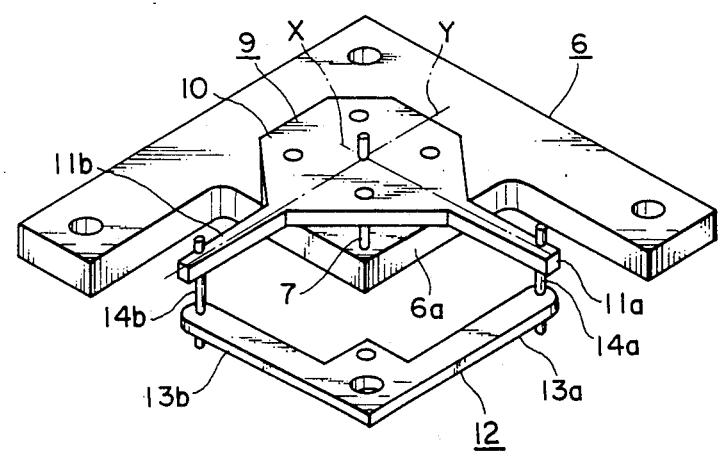
FIG. 3 is an enlarged-scale perspective view showing an essential part of the embodiment.

Referring now to FIG. 1, the illustrated embodiment of the present invention comprises a housing 1, which has a square bottom plate 2 and a top plate 3 of the same shape having a central circular hole 4, the top and bottom plates 2 and 3 being assembled together at the corners thereof by four connecting poles 5a to 5d. As shown in FIGS. 2 and 3, a substantially L-shaped intermediate plate 6 is supported by the connected poles 5a to 5c. It has an integral inner rectangular support portion 6a having a pointed end located at the plan view center of the housing 1. A needle-like support spring 7 upwardly projects from the pointed end noted above. Its position thus coincides with the plan view center of the housing 1.

A tiltable member 9 is securedly supported on the upper end of the needle-like support spring 7. It has a mounting portion 10 supporting a stationary boss 20 screwed to the top thereof and two connecting rod portions 11a and 11b extending along perpendicular x- and y-axes intersecting at the supporting point of the needle-like support spring 7 as shown in FIG. 1. The end portions of the connecting rod portions 11a and 11b respectively extend between the connecting poles 5a and 5d and between the connecting poles 5c and 5d. An L-shaped spring member 12 having perpendicular leaf spring projections 13a and 13b is supported by the connecting pole 5d, the end of the leaf spring projection 13a extending toward the connecting pole 5a being coupled to the connecting rod portion 11a via a vertically extending needle-like connecting spring 14a, and the end of the leaf spring projection 13b extending toward the connecting pole 5c being coupled to the connecting rod portion 11b via a vertically extending needle-like connecting spring 14b. The connecting springs 14a and 14b couple the connecting rod portions 11a and 11b and leaf spring portions 13a and 13b in vertical directions while permitting slight flexing in transversal directions.

A vertically extending piezoelectric stack 15a is provided at a position corresponding to substantially mid way between the needle-like support spring 7 and needle-like connecting spring 14a. Another vertically extending piezoelectric stack 15b is provided at a position corresponding to substantially mid way between the needle-like support spring 7 and needle-like connecting spring 14a. These piezoelectric stacks 15a and 15b are supported on the bottom plate 2 with their lower end screwed therein. They have respective contact balls 16 provided at their upper end (which is a displaceable end). These contact balls are in point contact with the bottom plane surface of the tiltable member 9 at positions thereof on the x- and y-axes.

The contact balls 16 are made of a hard material selected from a group consisting of hard metals such as stainless steel and chromium and hard ceramic materials such as silicon nitride and alumina.

The bottom surface of the tiltable member 9 which is contacted by the balls 16 is provided with hard material layers 19 made of the same material as the balls 16. The hard material layers 19 are formed by filling shallow recesses t formed in contact portions of the bottom surface with the material noted above. The hard material layers 19, however, are not needed in case where the entire tiltable member 9 is made of the same hard material as the balls 16.

Figure 4:
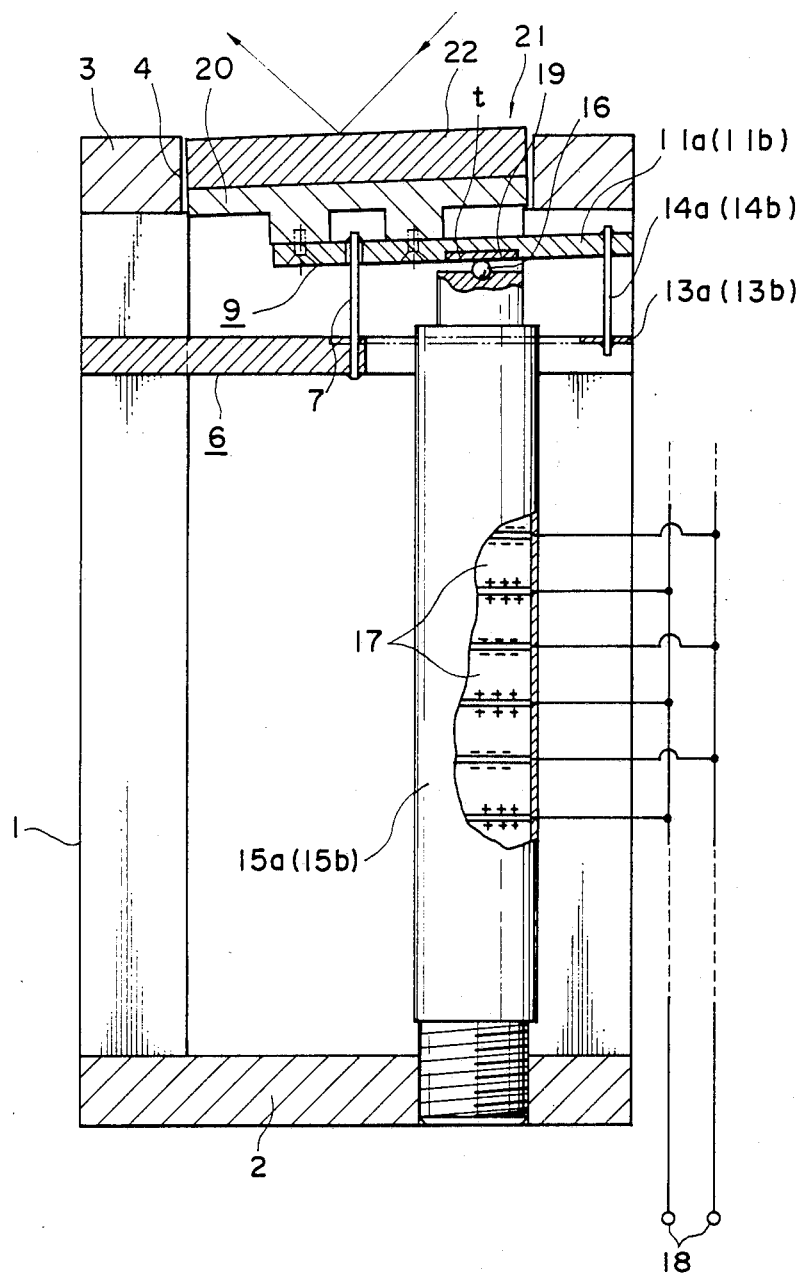
FIG. 4 is a sectional view taken along line A—A in FIG. 2.

The piezoelectric stacks 15a and 15b, as shown in FIG. 4, each consist of a plurality of piezoelectric elements 17 which are polarized in vertical directions. Each piezoelectric element 17 can be strained in vertical directions with application of a voltage between two input terminals 18, each of which is connected to like pole electrodes of the piezoelectric elements. The sum of the strains of the indiviudal piezoelectric elements produces elongation or contraction of the piezoelectric stack in vertical directions.

The stationary boss 20 which is screwedly secured to the tiltable member 9 is loosely received in the circular hole 4 of the top plate 3. A mirror 21 having a reflecting mirror surface 22 at the top is secured to the stationary boss 20.

The function of the embodiment will now be described with reference to FIGS. 4 and 5.

In the absence of a signal voltage applied to the piezoelectric stacks 15a and 15b, the mirror 21 is at a position with its reflecting mirror surface 22 flush with the top surface of the top plate 3 as shown in FIG. 4. To deflect light incident on the mirror 21 by a predetermined amount, a predetermined signal voltage is applied between the input terminals 18 of the piezoelectric stacks 15a and 15b.

Figure 5:
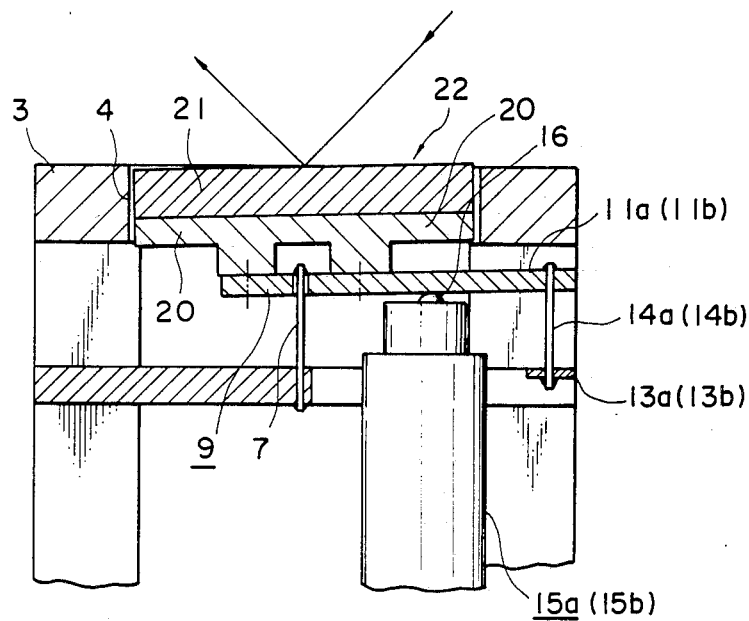
FIG. 5 is a sectional view taken along line A—A in FIG. 2 illustrating the operation of the embodiment.
Figure 6:
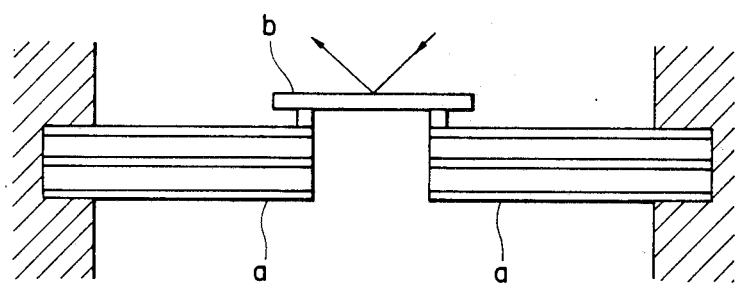
FIG. 6 is a longitudinal sectional view showing a prior art apparatus.

As a result, the piezoelectric stacks 15a and 15b are extended as shown in FIG. 5. At this time, the needle-like support spring 7 flexes slightly, so that the tiltable member 9, which is supported by point support by the needle-like support spring 7 projecting from the intermediate plate 6, can be tilted about the support spring 7 due to a lever action. The mirror 21 on the tiltable member 9 is thus tilted about the support spring 7 located at its center by an angle proportional to the applied signal voltage. The reflecting mirror surface 22 is thus tilted by a predetermined angle in the directions of the x- and y-axes corresponding to the piezoelectric stacks 15a and 15b. The incident light is thus deflected in the given direction. At this time, the ends of the tiltable member 9 are coupled to the leaf spring projections 13a and 13b via the needle-like connecting springs 14a and 14b such that their slight flexing is permitted. Therefore, with the tilting of the tiltable member 9 the leaf spring projections 13a and 13b are curved upwardly to bias the tiltable member 9 in the returning direction in FIG. 4. Thus, when the piezoelectric stacks 15a and 15b are contracted with the removal of the signal voltage applied between the input terminals 18, the tiltable member 9 with the mirror 21 is immediately returned to the position shown in FIG. 4.

As is shown, the tilting of the reflecting mirror surface 22 in the direction of the x-axis is controlled with the elongation and contraction of the piezoelectric stack 15a, and the tilting of the reflecting mirror surface 22 in the direction of the y-axis is controlled with the elongation and contraction of the piezoelectric stack 15b.

The mirror 21 can be returned together with the tiltable member 9 to the original position without the leaf spring projections 13a and 13b but with the sole returning action of the needle-like support spring 7. In this case, however, the response is slightly inferior.

Further, where the piezoelectric stacks 15a and 15b are coupled to the tiltable member 9 via needle-like connecting springs like the connecting springs 14a and 14b in lieu of the leaf spring projections 13a and 13b, the tiltable member 9 can be returned in unison with the piezoelectric stacks 15a and 15b. In this case, the connecting springs can flex in the transversal directions, so that the coupling gives rise to no problem in the tilting of the tiltable member 9 and movement of the piezoelectric stacks 15a and 15b in vertical directions.

The signal voltages applied to the respective piezoelectric stacks 15a and 15b may be varied to provide different extends and timings of elongation and/or contraction of the piezoelectric stacks 15a and 15b. By so doing, it is possible to cause a multi-dimensional tilting of the mirror 21 for different tilting angles in different directions according to the signal voltages. The reflecting mirror surface 22 thus can deflect the incident light in any desired direction. As an embodiment, it is possible to change the angle of a high frequency pulse light beam with satisfactory response character. Furthermore, while the needle-like support spring 7 projecting from the intermediate plate 6 has been utilized for the support of the tiltable member 9, it is also possible to utilize a mechanism which can support the member 9 at a point or in a narrow area, for instance by providing the intermediate plate 6 with a conical projection, providing the tiltable member with a concave curved surface for receiving the projection and coupling the projection and recess in a pivot-and-bearing relation to each other.

As has been described in the foregoing, according to the present invention the tiltable member 9 with the reflecting mirror surface 22 provided at the top is supported by point support and the piezoelectric stacks 15a and 15b capable of elongation and contraction in vertical directions are provided on the perpendicular x- and y-axes intersecting at the support point and at positions spaced apart therefrom so that the reflecting mirror surface 22 can be tilted about the support point with the elongation and contraction of the piezoelectric stacks. Thus, the deviation is not influenced by the load on the reflecting mirror surface 22, and sufficient mechanical strength can be ensured. Further, the extent and direction of tilting of the reflecting mirror surface 22 can be freely varied with high positional precision by varying the voltages applied to the piezoelectric stacks 15a and 15b.

What is claimed is:

1. A light deflection apparatus, which comprises:
a tiltable member having a reflective mirror surface supported thereon;
means for supporting the tiltable member, the supporting means supporting the tiltable member at a support point thereon;
first and second piezoelectric stacks, the first and second piezoelectric stacks being situated relative to the support point at positions spaced apart from the support point and respectively along perpendicular X and Y axes intersecting at the support point, each of the first and second piezoelectric stacks having displaceable ends, the displaceable ends being coupled to the tiltable member to effect the tilting of the member and the reflective mirror surface.

2. A light deflective apparatus, which comprises:

means defining a reflective mirror surface;

a tiltable member supporting the mirror surface defining means, the tiltable member including a mounting portion and first and second connecting rod portions extending outwardly from and perpendicularly to the mounting portion respectively along perpendicularly intersecting X and Y axes;

a needle-like support spring supporting the tiltable member at a support point thereon, the support point being situated at the intersection of the X and Y axes; and first and second piezoelectric stacks, each of the first and second piezoelectric stacks having a displaceable end, the displaceable end of the first piezoelectric stack being coupled to the first connecting rod portion, and the displaceable end of the second piezoelectric stack being coupled to the second connecting rod portion to effect the tilting of the tiltable member and the mirror surface defining means.

3. A light deflection apparatus as defined by claim 2, which further comprises a boss interposed between the mirror defining means and the mounting portion of the tiltable mirror.

4. A light deflection apparatus as defined by claim 2, which further comprises an L-shaped spring member, the L-shaped spring member having perpendicular first and second leaf spring projections, the first leaf spring projection being coupled to the first connecting rod portion of the tiltable mirror and the second leaf spring projection being coupled to the second connecting rod portion; and first and second needle-like connecting springs, the first connecting spring being interposed between and interconnecting the first leaf spring projection and the first connecting rod portion, and the second connecting spring being interposed between and interconnecting the second leaf spring projection and the second connecting rod portion.

5. A light deflection apparatus as defined by claim 2, which further comprises a pair of contact balls, one of the contact balls being interposed between and in contact with the first piezoelectric stack and the first connecting rod portion, and the other of the contact balls being interposed between and in contact with the second piezoelectric stack and the second connecting rod portion.

6. A light deflection apparatus as defined by claim 5, wherein each of the first and second connecting rod portions includes a recess formed therein, and a hard material layer received by the recess, the recesses and hard material layers being situated on the tiltable member over portions thereof which contact the first and second contact balls.

* * * * *